United States Patent [19]

Andersson

[11] Patent Number: 4,517,879

[45] Date of Patent: May 21, 1985

[54] MACHINE COMPRISING A RECIPROCATING OPERATIVE MEMBER

[75] Inventor: Karl Erik E. Andersson, Kvänum, Sweden

[73] Assignee: Verktygsingustri I Blidsberg Aktiebolag, Blidsberg, Sweden

[21] Appl. No.: 527,475

[22] Filed: Aug. 29, 1983

[30] Foreign Application Priority Data

Sep. 17, 1982 [SE] Sweden .............................. 8205339

[51] Int. Cl.³ ............................................... F16J 1/02
[52] U.S. Cl. ....................................... 92/136; 92/178; 100/258 R; 308/6 R
[58] Field of Search ............. 92/136, 178; 100/258 R, 100/258 A, 46; 308/6 R

[56] References Cited

U.S. PATENT DOCUMENTS

| | | | |
|---|---|---|---|
| 162,652 | 4/1875 | Hoe | 308/6 R |
| 1,469,689 | 10/1923 | Prius | 100/258 A |
| 2,217,172 | 10/1940 | Laussucq | 100/258 R |
| 2,224,475 | 12/1940 | Evans | 92/178 |

FOREIGN PATENT DOCUMENTS

| | | | |
|---|---|---|---|
| 639048 | 3/1962 | Canada | 308/6 R |
| 1901740 | 8/1970 | Fed. Rep. of Germany | 92/136 |

*Primary Examiner*—Paul E. Maslousky
*Attorney, Agent, or Firm*—Fred Philpitt

[57] ABSTRACT

In a machine of the kind in which an operative member under the actuation of driving means is reciprocatable relative to a guide member in order to exert forces in a predetermined direction on a workpiece, toothed and elongate roller bodies having their axes of rotation extending perpendicularly to said direction are interposed between the guide member and the operative member in order to prevent the latter from tilting. The teeth of each roller body mesh with the teeth of racks extending in said direction of movement of the operative member and being provided on both the guide member and the operative member in a manner to cause each roller body to transmit under torsional strain balancing forces in its axial direction. The roller bodies also have cylindrical surface portions being coaxial with and having the same diameter as the pitch circles of their teeth, said cylindrical portions being in rolling contact with rollways provided on both the operative member and the guide member.

6 Claims, 4 Drawing Figures

MACHINE COMPRISING A RECIPROCATING OPERATIVE MEMBER

BACKGROUND OF THE INVENTION

1. Field of the Invention

This invention relates to machines of the kind in which an operative member under the actuation of driving means is reciprocatable relative to a guide member in a predetermined direction in order to exert in that direction forces on one or more workpieces, and in which the operative member has such extent in at least one direction in a plane perpendicular to its direction of movement that it is likely to be subjected to tilting loads. If such tilting loads are permitted to cause tilting of the operative member, the machine will not operate properly as intended and may even become damaged.

It is to be understood that the tilting load on the operative member may not only be caused by mistakes made in the operation of the machine but may as well be a forseeable consequence of the kind of work to be carried out by the machine, or of the particular design of the same, such as for example, when the operative member is directly actuated by two or more pressure fluid operated cylinders which need a mechanical intercoupling to cooperate in desired synchronism.

Typical examples of machines of the kind in question are presses, in particular presses used in working sheet metal, such as drawing presses, folding presses, shearing machines and the like. However, also in many other machines, in which the stroke of the operative member is short as compared with the length and/or width of said member measured in a plane perpendicular to the direction of movement thereof, similar problems in preventing the operative member from tilting are encountered.

2. Description of the Prior Art

In conventional machines of the kind referred to hereinbefore the operative member is most commonly designed to move in sliding contact with columns or rails forming part of a machine frame and thus constituting a kind of guide member therein. If in such machines severe tilting problems are anticipated, they are usually met by extending the length, counted in the direction of movement of the operative member, over which guidance is effected. The result of this frequently is that the machine becomes extremely heavy and ungainly.

Through the French Patent Publication No. 2,461,577 there is also known a press of the kind referred to, in which a press platen of rectangular shape and considerable horizontal extent is vertically movable in a frame and is driven by a fairly complex driving arrangement supported by an elongate bridge which is movable relative to the press platen as well as to the frame, and on which mutually parallel driving shafts provided with pinions are journalled in fixed bearings, one at each end of the bridge. By means of a motor supported by the bridge the two driving shafts may be simultaneously rotated in opposite directions in order to cause the bridge to "climb" upwards or downwards relative to the frame, whereby the press platen in its turn will move in the same direction as the bridge but twice as long a distance as the bridge itself. The primary conception behind this arrangement evidently is to uniformly distribute the driving power of the motor to the four corners of the rectangular press platen, whereby a tilting of the press platen is prevented. However, for practical use this known arrangement is scarcely attractive because of its complex design, its consequent sensivity to breakdowns, and the evident difficulties in transmitting to the press platen the great forces, not rarely in the magnitude of 1 MN (meganewton) or more, which are often required for carrying out the pressing operation.

SUMMARY OF THE INVENTION

The aim of the present invention is to provide an improved arrangement for efficiently preventing tilting of the operative member in machines of the kind referred to hereinbefore entirely independent of, how the same is imparted its reciprocating motion and without using guideways of extreme length. For this purpose the invention is based on the use of a particular kind of separate, toothed and elongate roller bodies to be interposed between the operative member and the guide member for transmitting under torsional strain balancing forces in their axial directions between toothed surface portions of said two members.

Thus in a machine according to the invention the operative member may be actuated by any kind of driving means and, hence, in the simplest and most advantageous manner from case to case, because the roller bodies, which do not even need to be individually mounted in bearings, exclusively take care of the tilting-preventing task by transmitting in their longitudinal directions, under torsional strain but without noticeable distortion, balancing forces between co-planar areas of the opposed toothed surface portions of the operative member and the guide member, which areas are spaced in the axial directions of the respective roller bodies. Such transmission of balancing forces occurs whenever the operative member is subjected to a tilting moment in a plane that is parallel to the direction of movement of the operative member and to the axes of rotation of the respective roller bodies.

In a given machine the maximum tilting moment, i.e. the one occurring in the most serious case of tilting load, and hence the required torsional stiffness of each roller body partaking in counteracting such load as well as the required strength of the teeth thereof may be easily calculated with a knowledge of the magnitude of the available maximum actuating force and the position of the point on the operative member, where this force is applied, in relation to the point, where the operative member encounters resistance during its movement, and, of course, the number and the directions of the axes of the roller bodies involved.

Other objects and features of the invention will appear from the following description of an example of the application thereof in a press when considered in connection with the accompanying drawings.

DESCRIPTION OF THE PREFERRED EMBODIMENT

Figure 1:
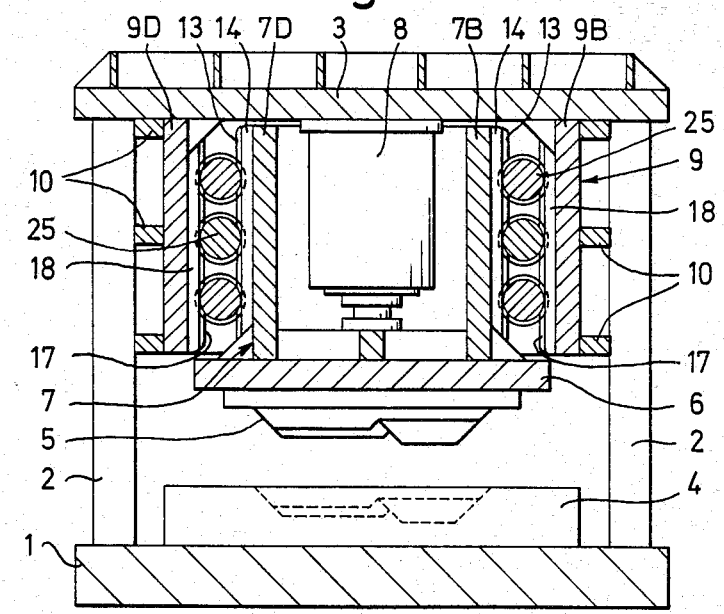
FIG. 1 is a cross sectional elevation of a press embodying the invention.
Figure 2:
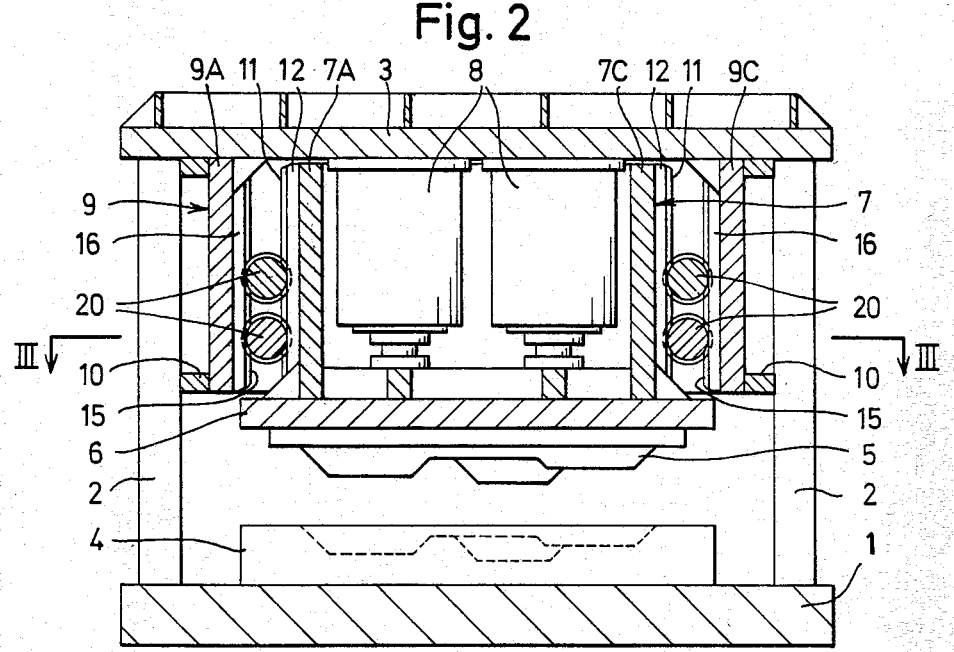
FIG. 2 is a longitudinal sectional elevation of the same press.

The press shown in its entirety in FIGS. 1 and 2 comprises a base plate 1, four columns 2 and a slab-like upper frame part 3 which by means of the columns is supported and fixed at a distance above the base plate. The frame structure thus formed must, of course, be capable of resisting without noticeable deformation all the forces which may occur when the press is operated. The press chosen as an example is assumed to be used in deep-drawing sheet metal blanks and is therefore equipped with a die 4, which in a known manner is fixed on the base plate 1, and with a stamp 5, which in its turn in a known manner is fixed on the lower side of a generally rectangular movable platen 6 having a considerable horizontal extent. This platen 6 forms the bottom of a box-shaped press head, which is generally designated by 7 and which represents the operative member of the press.

The press head 7 is vertically movable in the aforementioned frame structure 1-3, in the present case under the joint actuation of two double-acting hydraulic cylinders 8, which are symmetrically placed between said head and the upper frame part 3 within the box-like press head. In a conventional manner, not shown, the two hydraulic cylinders 8 are connected to a common pressure fluid source through a valve system controlling the operation of the press. It is to be noted that, if so desired, the two hydraulic cylinders 8 shown may be replaced by a single one or by a greater number of cylinders, and that a symmetrical placing of the hydraulic cylinder or the hydraulic cylinders is in no way necessary, especially not if the press already from the beginning is designed for a specific task, for which an asymmetrical cylinder arrangement may be more advantageous. Of course, instead of hydraulic cylinders, pneumatic ones or any known mechanical driving arrangement, for example of the eccentric-shaft type, the screw type or the toggle type, may be used, and the driving means do not need to be entirely encased as illustrated.

During its reciprocating movement, the stroke of which is substantially smaller in the vertical direction than the greatest horizontal extent of the platen 6, the press head 7 is guided by a likewise box-shaped guide member, which is generally designated by 9 and which is secured to the upper frame part 3. As an alternative, this guide member may, of course, be made integral with the upper frame part 3. In the example shown, the guide member 9, which is generally rectangular in horizontal section and surrounds the press head 7, is on its external side provided with horizontal reinforcement ribs 10 taking support against the columns 2, whereby the guide member is prevented from yielding to lateral forces possibly arising during the operation of the press.

Figure 3:
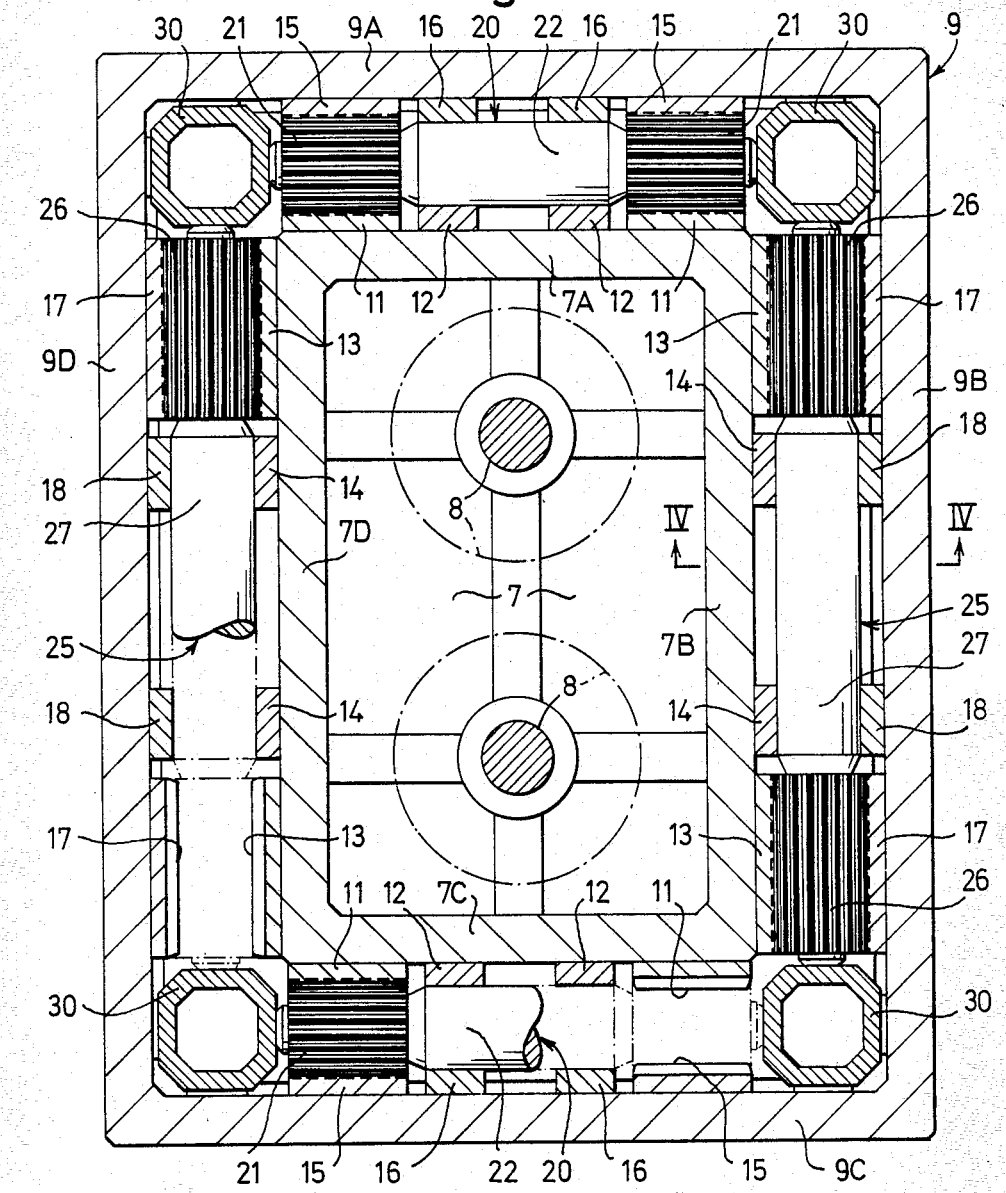
FIG. 3 is a partial and horizontal section taken along the line III—III in FIG. 2 but on an enlarged scale.

As best appears from FIG. 3, which shows the press head 7 enclosing the cylinders 8 together with its surrounding guide member 9 only, the box-shaped press head has a generally rectangular shape as seen from above and four vertical walls 7A, 7B, 7C and 7D, which are parallel in pairs. The same is true for the guide member 9, the walls 9A, 9B, 9C and 9D of which have their inner sides lying at a certain distance outside the outer sides of the corresponding press head walls and are parallel to them and to the vertical direction of movement of the press head.

On the outer side of each of the two press head walls 7A and 7C two broad, vertically extending racks 11 are secured, one at each lateral edge, and inside them two likewise vertical rails 12 forming rollways are secured. In a corresponding manner, on the outer side of each of the two press head walls 7B and 7D two broad racks 13 and two rails 14 forming rollways are secured. In the example shown all the racks 11 and 13 have straight, horizontally extending teeth with uniform size and pitch. The racks 11 are all mutually alike as far as thickness and width are concerned, and the same is true as regards the rails 12 forming the rollways, the thickness of which is so chosen that their outwardly facing surfaces will be in a plane representing the pitch plane of the teeth of the racks 11. In a corresponding manner all the racks 13 are mutually alike but broader than the racks 11, whereas the rails 14 forming the rollways are slightly broader than the rails 12 and have a thickness which is so chosen that their outwardly facing surfaces will lie in a plane representing the pitch plane of the teeth of the racks 13.

The guide member 9 is in its turn on the inner side of each of its two parallel walls 9A and 9C provided with two vertical racks 15 registering with and opposing the racks 11 on the press head 7 and having the same width, tooth size and pitch as them, and also with two vertically extending rails 16 forming rollways, the inwardly facing surfaces of which lie in the pitch plane of the teeth of the racks 15. In a similar manner, on the inner side of each of the walls 9B and 9D of the guide member 9 there are secured two vertical racks 17 registering with and opposing the racks 13 on the press head 7 and having the same width, tooth size and pitch as them, and also two vertically extending rails 18 forming rollways, the inwardly facing surfaces of which lie in the pitch plane of the teeth of the related racks 17, i.e. the racks secured to the same wall of the guide member. Also on the racks 15 and 17 the teeth are straight and horizontal.

All the racks 11, 13, 15 and 17 may, if so desired, be replaced by vertically extending series of teeth formed directly in the material of the press head 7 and of the guide member 9, respectively, but when the manufacture will be more complicated, of course, and at the same time the possibilities for compensating occurring manufacturing tolerances by means of shims is reduced. However, it is not necessary to make the four walls 7A-7D of the press head 7 or the four walls 9A-9D of the guide member 9 in one piece, as has been indicated in FIG. 3 for the sake of simplicity only. Instead the different walls may be separately made and then joined together into rigid units in any arbitrary known manner, for instance by bolt connections, and in such a case a certain compensation of possible tolerances may be accomplished in the joints between the different walls. The important thing in using separately made racks is to secure them to the press head 7 and the guide member 9, respectively, in such reliable manner that they cannot change their positions in the vertical direction during the operation of the press.

As shown by FIG. 2, between the outer side of each of the press head walls 7A and 7C and the inner side of the opposed guide member wall 9A and 9C, respectively, two roller bodies 20 having horizontal axes of rotation are interposed, one above the other. Each of these roller bodies 20, which within close manufacturing tolerances are identical with one another, has adjacent each end a circumferential tooth series 21, the teeth of which are adapted to mesh in a force-transmitting manner and with a minimum play with the teeth on the related, opposed racks 11 and 15 on the press head 7 and the guide member 9, respectively. Intermediate the two tooth series 21, which are mutually identical in respect of diameter, number of teeth, tooth size and pitch, each roller body 20 has a cylindrical portion 22, the outer diameter of which corresponds to the diameter of the pitch circle of the two tooth series 21, and this cylindrical portion 22 lies in rolling contact with both the related rails 12 and 16 forming rollways on the press head 7 and the guide member 9, respectively.

Hereby the roller body is centered between the related pairs of racks 11 and 15 in such manner that the tooth mesh between the roller body and the latter will take place under the best possible conditions, while at the same time the cylindrical portion 22 of the roller body in its cooperation with the rails 12 and 16 maintains a given distance between the press head and the guide member and thereby efficiently relieves the meshing teeth from undesirable strains which might otherwise emanate from horizontal component forces possibly acting on the press head 7 in a direction perpendicular to its walls 7A and 7C during the operation of the press. In addition, the two groups of roller bodies placed on opposite sides of the press head 7 assist, of course, in centering the press head relative to the guide member 9 in the direction just mentioned.

As the two roller bodies 20 in each group must be located at such a vertical distance from each other that a direct mutual engagement between their respective tooth series 21 is avoided, they will also serve as a roller guide for the press head 7, but this effect fails to appear, of course, if the two roller bodies 20 on each short side of the press head are replaced by a single one only, which is possible, namely if the tilting moment which may come to act on the press head in a plane parallel to its walls 7A and 7C is of only a moderate magnitude compared to the tilting-preventing effect which a single roller body can render.

It should be understood that, when two or more roller bodies are used between the same pair of opposed toothed surface portions, such as the surface portions 11 and 15, they will share the task of transmitting balancing forces between them. The forces, to which each individual roller body is subjected in case of a tilting load on the press head 7, is thereby considerably reduced. Thus, by increasing the number of roller bodies between a given pair of opposed toothed surface portions either greater tilting moments may be governed or more slender roller bodies with weaker teeth may be used.

In a similar manner, between the outer side of each of the press head walls 7B and 7D and the inner side of the opposed guide member wall 9B and 9D, respectively, three vertically spaced roller bodies 25 having horizontal axes of rotation are interposed, said roller bodies 25 all being identical with each other. Also each roller body 25 has adjacent its respective ends, mutually alike circumferential tooth series 26 for force-transmitting cooperation with the racks 13 and 17 and, intermediate the two tooth series, a cylindrical portion 27, the outer diameter of which corresponds to the diameter of the pitch circle of the tooth series 26. These roller bodies 25 in all respects have the same effects as the roller bodies 20 described hereinbefore although they act, of course, in planes perpendicular to the planes in which the roller bodies 20 transmit balancing forces. Also here the number of roller bodies 25 in each group, i.e. on opposite sides of the press head, may be varied according to need.

Figure 4:
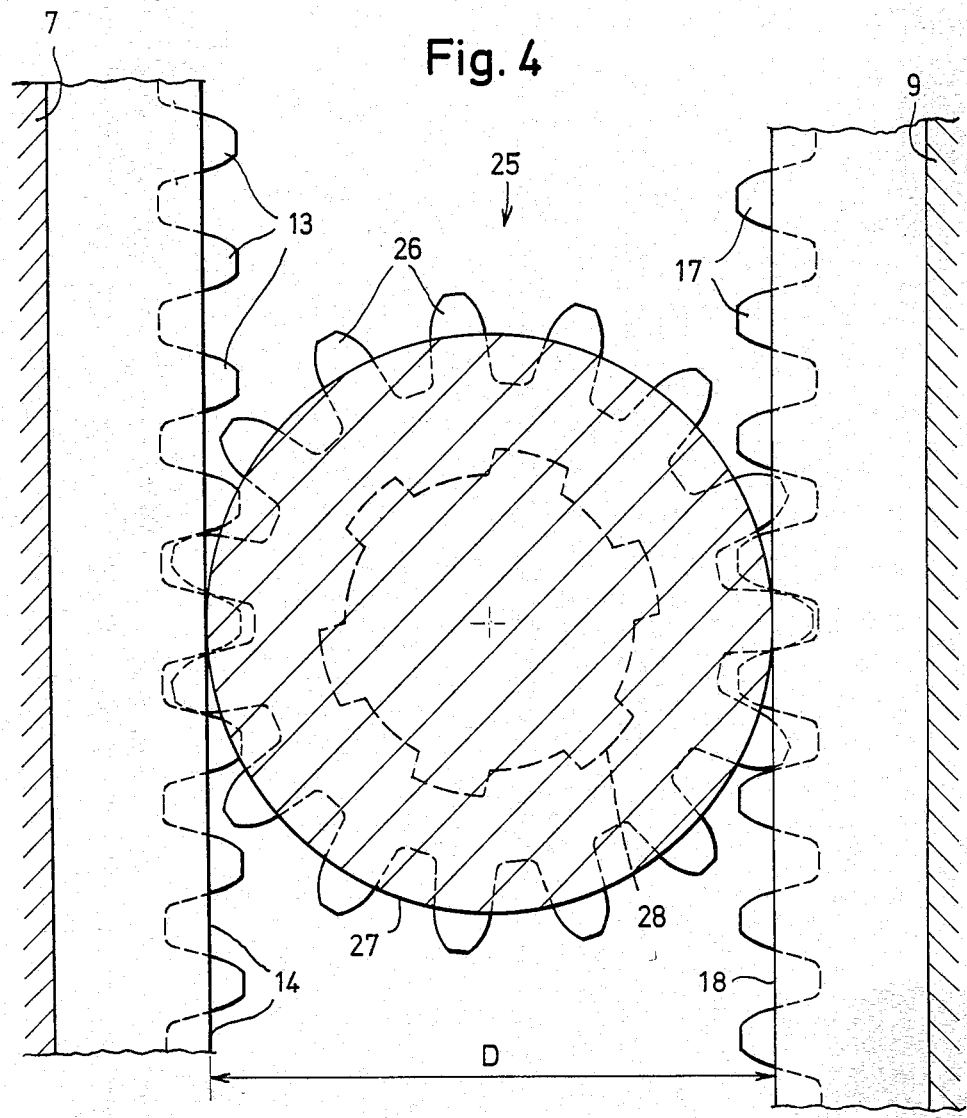
FIG. 4 is a simplified fragmentary section on line IV—IV of FIG. 3 on a still larger scale.

The cooperation taking place between each roller body and the corresponding racks and rollways on the press head and the guide member is illustrated more in detail in FIG. 4, where the cylindrical portion 27 of one of the roller bodies 25 is shown in section and in rolling contact with the related rail 14 on the press head 7 as well as with the opposed rail 18 on the guide member 9, and where one tooth series 26 of the roller body is shown, partly by dashed lines, to be in force-transmitting engagement with corresponding racks 13 and 17, respectively. Also, in FIG. 4 the possibility is indicated that each circumferential tooth series on each roller body may be formed by a separately manufactured pinion, which by means of splines 28 is unrotatably fixed on the remainder of the roller body. As an alternative the teeth 26 can, of course, be made integral with the roller body. By the fact that the cylindrical portion of the roller body has an outer diameter D which corresponds to the diameter of the pitch circle of the circumferential tooth series 26 of the roller body, it is assured, as is easily understood, that the teeth mesh under the most ideal conditions ever possible in spite of the fact that the roller body 25 is not supported or guided by any radial bearings.

FIG. 3 further shows, how the various roller bodies 20 and 25 in the case illustrated are kept in place in their axial directions by means of vertically extending tubular guiding means 30 inserted in the inner corners of the guide member 9 and suitably made of a bearing material, against which the end surfaces of the roller bodies abut. The forces which these guiding means 30 need to take up, are commonly very small, and, hence, the wear on them will be small. From FIG. 3 it also appears that the effective length of each roller body practically corresponds to the horizontal width of that outer side of the press head 7 with which the roller body cooperates, and that the flank length of each tooth series on each roller body to advantage corresponds to about one fourth of the effective length of the roller body, although it may in certain cases be somewhat greater or smaller. Of course, the greater the flank length is, the greater forces can be transmitted with a moderate tooth size and pitch, which in its turn permits the use of a greater number of teeth on a roller body having an adequate torsional stiffness and diameter, whereby undercut teeth which are difficult to manufacture most frequently can be avoided in the tooth series of the roller bodies. A great flank length also facilitates the correct positioning of the roller bodies between the press head and the guide member.

It is to be understood that the magnitude of the balancing force to be transmitted axially and torsionally through each roller body for compensating a certain tilting moment acting on the press head or operative member depends on the effective length of the roller body, i.e. the axial distance between the tooth ends being closest to the respective ends of the roller body. Accordingly, it is recommendable to make the effective length of the roller body as great as possible from case to case, and to let the rolling contact between the roller body and the centering rollways take place intermediate two axially spaced, circumferentially extending series of teeth on the roller body, as shown.

When the press shown and described is operated, the press head 7 is actuated in the vertical direction relative to the guide member 9 by means of the two cooperating hydraulic cylinders 8. The roller bodies 20 and 25 then roll along their rollways 12 and 16, and 14 and 18, respectively, and mesh with the racks 11 and 15, and 13 and 17, respectively. If then, for one reason or another, the two hydraulic cylinders 8 are incapable of exerting exactly the same force on the press head 7, and/or the tool 5 supported by the press platen 6 when contacting the work-piece, i.e. the sheet metal blank to be deep-drawn which in a conventional manner is fixed on the die 4, meets a resistance acting asymmetrically in relation to a transverse vertical plane lying midway between the two hydraulic cylinders 8, the roller bodies 25 will jointly under torsional strain transmit forces from their one tooth series 26 to the other in order to either accelerate that part of the press head, which would otherwise lag, or retard that part of the press head, which would otherwise advance too far in the direction of movement.

In a corresponding manner, all moments acting to tilt the press head 7 in its transverse direction are counteracted by axial force transmission by the roller bodies 20 from their one tooth series 21 to the other. Thus the press platen 6 will always remain parallel to itself when it is moved towards and away from the base plate 1, provided that the roller bodies 20 and 25 are capable of transmitting the occurring forces without being distorted and without their teeth or the corresponding rack teeth being damaged.

As is easily understood, during the movements of the press head 7, each roller body 20, or 25 respectively, will move relative to the guide member 9 in the same direction as the press head but only half the distance covered by the press head. Therefore, the racks 11, 13, 15 and 17 must be of such length and be positioned in such a manner on the press head and on the guide member, respectively, that they permit this movement of the roller body also at the maximum stroke length of the press. The required length of the racks also depends on the number of cooperating roller bodies used on the same side of the press head. On the other hand it is not necessary, of course, that the roller bodies on different sides of the press head lie in a common horizontal plane. Neither is it necessary that the roller bodies on different sides of the press head have the same number of teeth, the same tooth size and pitch, and the same diameter, although this is often advantageous from the manufacturing point of view.

The press shown and described is only an illustrative example of the application of the invention, and must not be apprehended as limiting for the scope of the following claims. Thus the press head may instead have a square shape as seen from above, in which case identical roller bodies may be used on all its four sides. Further, in certain types of machines, for example in folding presses and shearing machines, the operative member, corresponding to the press head in the example shown, may in a plane perpendicular to its direction of movement have a great length but such a small width that the tilting moments, which can occur in the transverse direction, will be very small. In such a case it is sufficient to use roller bodies of the kind described only on two opposite sides of the operative member, namely the sides which are parallel to the longitudinal direction of the member.

I claim:

1. A machine of the kind comprising an operative member which under direct actuation of driving means is reciprocatable relative to a guide member in a predetermined direction of movement for exerting forces on a workpiece in said direction,
   (A) wherein said operative member has
      (a) at least one first rack-like toothed surface portion extending in said direction of movement and having teeth extending at an angle to said direction, and
      (b) at least one first rollway extending in said direction of movement and having a treadconstituting surface which is co-planar with a pitch plane of said first toothed surface portion;
   (B) wherein said guide member has
      (c) at least one second rack-like toothed surface portion extending in said direction of movement and having teeth extending at an angle to said direction, and
      (d) at least one second rollway extending in said direction of movement and having a treadconstituting surface which is co-planar with a pitch plane of said second toothed surface portion;
   (C) wherein said first and second toothed surface portions on said operative member and said guide member, respectively, are opposed to each other, lie in mutually spaced but parallel planes, and have teeth of the same size and pitch;
   (D) wherein at least one elongate roller body being entirely separate from said driving means and having an axis of rotation extending at a right angle to said direction of movement is interposed between said operative member and said guide member, said roller body having
      (e) at least one circumferentially extending series of teeth meshing with the teeth of said first and second toothed surface portions on said operative member and said guide member, respectively, and
      (f) at least one cylindrical body portion which is coaxial with and has the same diameter as a pitch circle of the tooth series of said roller body, said cylindrical body portion being in rolling contact with said first and second rollways on said operative member and said guide member, respectively, for centering said roller body between said opposed first and second toothed surface portions on said two members; and
   (E) wherein said roller body is free to roll relative to both said operative member and said guide member in said direction of movement, in response to said operative member being actuated, thereby to counteract any tilting tendency of said operative member in a plane which is parallel to said direction of movement and to the axis of rotation of said roller body.

2. A machine according to claim 1, wherein
   (A) said operative member has at least two co-planar first rack-like toothed surface portions having at least one first rollway between them,
   (B) said guide member has at least two co-planar second rack-like toothed surface portions having at least one second rollway between them, and
   (C) each elongate roller body has two axially spaced circumferentially extending series of teeth being located near opposite ends of the roller body and having at least one cylindrical body portion between them, each of said two tooth series meshing with one of said first and second toothed surface portions on said operative member and said guide member, respectively.

3. A machine according to claim 1, wherein between each pair of opposed first and second toothed surface portions on said operative member and said guide member, respectively, at least two parallel roller bodies are interposed, said roller bodies being mutually spaced in said direction of movement in a manner to preclude direct tooth mesh between them.

4. A machine according to claim 1, wherein
(A) at least one first rack-like toothed surface portion is provided on each of two opposite sides of said operative member,
(B) at least two second rack-like toothed surface portions are provided on said guide member in positions to oppose each one of said two opposite first toothed surface portions on said operative member, and
(C) at least one roller body is interposed between each opposed pair of first and second toothed surface portions on said operative member and said guide member, respectively.

5. A machine according to claim 1, wherein
(A) said operative member has at least two faces extending in said direction of movement but forming an angle to one another, each of which faces has two co-planar first rack-like toothed surface portions and at least one first rollway between them,
(B) said guide member has at least two second faces extending in said direction of movement and opposing said first faces of said operative member in spaced and parallel relationship thereto, each of which faces has two co-planar second rack-like toothed surface portions and at least one second rollway between them, and
(C) at least one elongate roller body is interposed between each pair of opposed first and second faces of said operative member and said guide member, respectively, each of said roller bodies having two axially spaced circumferentially extending series of teeth located near opposite ends of the roller body and having at least one cylindrical body portion between them.

6. A machine according to claim 5, wherein
(A) said operative member when seen in a plane perpendicular to said direction of movement has a generally rectangular shape defined by four external first faces,
(B) said guide member has four internal second faces opposing said first faces of said operative member, and
(C) at least one elongate roller body is provided between each of said four external first faces on said operative member and the corresponding internal second face of said guide member.

* * * * *

UNITED STATES PATENT AND TRADEMARK OFFICE
CERTIFICATE OF CORRECTION

PATENT NO. : 4,517,879
DATED : May 21, 1985
INVENTOR(S) : KARL ERIK ANDERSSON

It is certified that error appears in the above—identified patent and that said Letters Patent is hereby corrected as shown below:

The name of the assignee has been misspelled please correct it to:

[73] Assignee: Verktygsindustri I Blidsberg Aktiebolag
Blidsberg, Sweden

Signed and Sealed this

First Day of July 1986

[SEAL]

Attest:

DONALD J. QUIGG

Attesting Officer

Commissioner of Patents and Trademarks